US008566401B1

(12) United States Patent
Hernacki et al.

(10) Patent No.: US 8,566,401 B1
(45) Date of Patent: Oct. 22, 2013

(54) METHOD AND APPARATUS FOR ENABLING E-MAIL ROUTING AND FILTERING BASED ON DYNAMIC IDENTITIES

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 850 days.

(21) Appl. No.: 11/644,511

(22) Filed: Dec. 22, 2006

(51) Int. Cl.
*G06F 15/16* (2006.01)

(52) U.S. Cl.
USPC .......................................... 709/206; 709/204

(58) Field of Classification Search
USPC ................................................. 709/206, 204
See application file for complete search history.

(56) References Cited

U.S. PATENT DOCUMENTS

| | | | |
|---|---|---|---|
| 2001/0037316 A1* | 11/2001 | Shiloh | 705/74 |
| 2005/0004992 A1* | 1/2005 | Horstmann et al. | 709/206 |
| 2005/0198153 A1* | 9/2005 | Keohane et al. | 709/206 |
| 2005/0204011 A1* | 9/2005 | Velayudham | 709/206 |
| 2006/0036951 A1* | 2/2006 | Marion et al. | 715/733 |

OTHER PUBLICATIONS

Schwartz ("SpamAssassin", Alan Schwartz, O'Reilly Media, Jul. 20, 2004).*
Spamgourmet ("Spamgourmet", www.Spamgourment.com, Feb. 2, 2001).*

* cited by examiner

*Primary Examiner* — Dustin Nguyen
*Assistant Examiner* — Joel Mesa
(74) *Attorney, Agent, or Firm* — Wilmer Cutler Pickering Hale and Dorr LLP

(57) ABSTRACT

A method and apparatus for enabling e-mail routing and filtering based on dynamic identities is presented. In one embodiment, the method includes provisioning a new e-mail address, and notifying an e-mail backend of the provisioned address wherein the provisioned address includes a list of authorized senders.

16 Claims, 2 Drawing Sheets

METHOD AND APPARATUS FOR ENABLING E-MAIL ROUTING AND FILTERING BASED ON DYNAMIC IDENTITIES

BACKGROUND OF THE INVENTION

1. Field of the Invention

The present invention generally relates to computers and, more particularly, to techniques for enabling e-mail routing and filtering based on dynamic identities.

2. Description of the Background Art

Some Internet sites and/or Internet service providers use identity management protocols, such as the protocols distributed under the trademarks CARDSPACE and OPEN ID, to electronically identify authorized users. CARDSPACE and OPEN ID allow users to provide their digital identities in a familiar, secure, and easy manner. In the physical world, we use business cards, credit cards and membership cards as forms of identification. Online, using identity management protocols, users can create a variety of virtual cards to electronically identify themselves to service providers. Each virtual card a user creates is also known as a separate "persona."

A single user may have multiple personas. For example, a user may have a work persona, a personal persona, an Internet relay chat (irc) persona, a gaming persona, and the like. One reason personas are used is to limit information correlation between sites, groups of sites, or service providers. In other words, it is hard to connect the activities of a user who has a work persona having an e-mail address of BobSmith@abccompany.com and a gaming persona with a gaming screen name of "ClownOverlord." Even though these personas are associated with the same person, as long as the user consistently uses each persona for work and gaming respectively, their identity should be more secure than if they used the same persona for each activity. While there may be a need for legal recourse to trace both personas to the same entity, for most interaction purposes the use of personas is accepted and justified. It should be understood that many service providers employ multiple internet sites and use these multiple sites to correlate user information. It can therefore be important to users to use different personas with various sites even though the sites may share data with the same service provider.

Identity systems known in the art or that may be developed in the future can assist a user in creating these different personas. In some identity systems, it may be possible for users to create site-specific or persona specific e-mail addresses, as part of their personas, in the hopes of keeping their real identity private. A site-specific e-mail address is an address that the user only provides to a particular site as part of their electronic identity. A persona-specific e-mail address is an address the user provides to multiple persons or sites based on the interests of the user. For example, a user can create a gambling persona e-mail account, such as moneymaker@abccompany.com, and provide this e-mail address only to persons and/or sites that are associated with user related gambling interests. The e-mail addresses may even be generated automatically for the user.

Once the user shares the e-mail with a site or service provider, it should be expected that the site or service provider will send e-mail to that particular e-mail address. When e-mail is received by a typical e-mail routing and filtering backend, the e-mail may be routed to some central location where the user can download and/or read the e-mail. Since these e-mail addresses might be automatically generated, users may distribute these addresses more freely than their primary e-mail address, feeling that the new e-mail addresses are less likely to receive SPAM than their primary e-mail address. Unfortunately, these e-mail addresses, like many e-mail addresses, are likely to attract SPAM regardless of how they were created. It should be understood that any received SPAM e-mails will likely become mixed together in the central inbox with legitimate e-mail messages, making it difficult and/or frustrating for the user to sift through their inbox. Other legitimate e-mails, having different contexts, may also become mixed together in the central location, again likely causing user frustration as they attempt to sort the e-mail by subject, topic, or other user preferred contexts.

Therefore, there is a need in the art for a method and apparatus the routes and filters email based upon dynamic entities.

SUMMARY OF THE INVENTION

A method and apparatus for enabling e-mail routing and filtering based on dynamic identities is provided. In at least one specific embodiment, the method includes provisioning a new e-mail address, and notifying an e-mail backend of the provisioned address, wherein the provisioned address is associated with a list of authorized senders.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A method and apparatus for enabling e-mail routing and filtering based on dynamic identities is provided. The method and apparatus allow users to set preferences regarding the various number and types of electronic communication identities utilized by the user wishes to have. In one or more embodiments, the dynamic identities are used to route and filter user communications based on certain attributes of the dynamic identities. For example, if the user is interacting with a gaming site, the user can chose to have a dynamic e-mail address, internet message (IM) address, or other electronic communication address created and have that address associated with that particular game site. When electronic communications associated with the game site, for example, e-mail, is received from the site, an e-mail backend can filter and route the received e-mail to an inbox associated with that particular site using portions of the dynamic identity information. Accordingly, a user can have e-mail delivered to different inboxes depending on the particular dynamic identity and the sender identity. Being able to dynamically generate electronic communication identities can help prevent identity correlation between sites by generating and associating different identities with different sites. In at least one specific embodiment, the method includes provisioning a new e-mail address, and notifying an e-mail backend of the provisioned address wherein the provisioned address includes a list of authorized senders.

Figure 1:
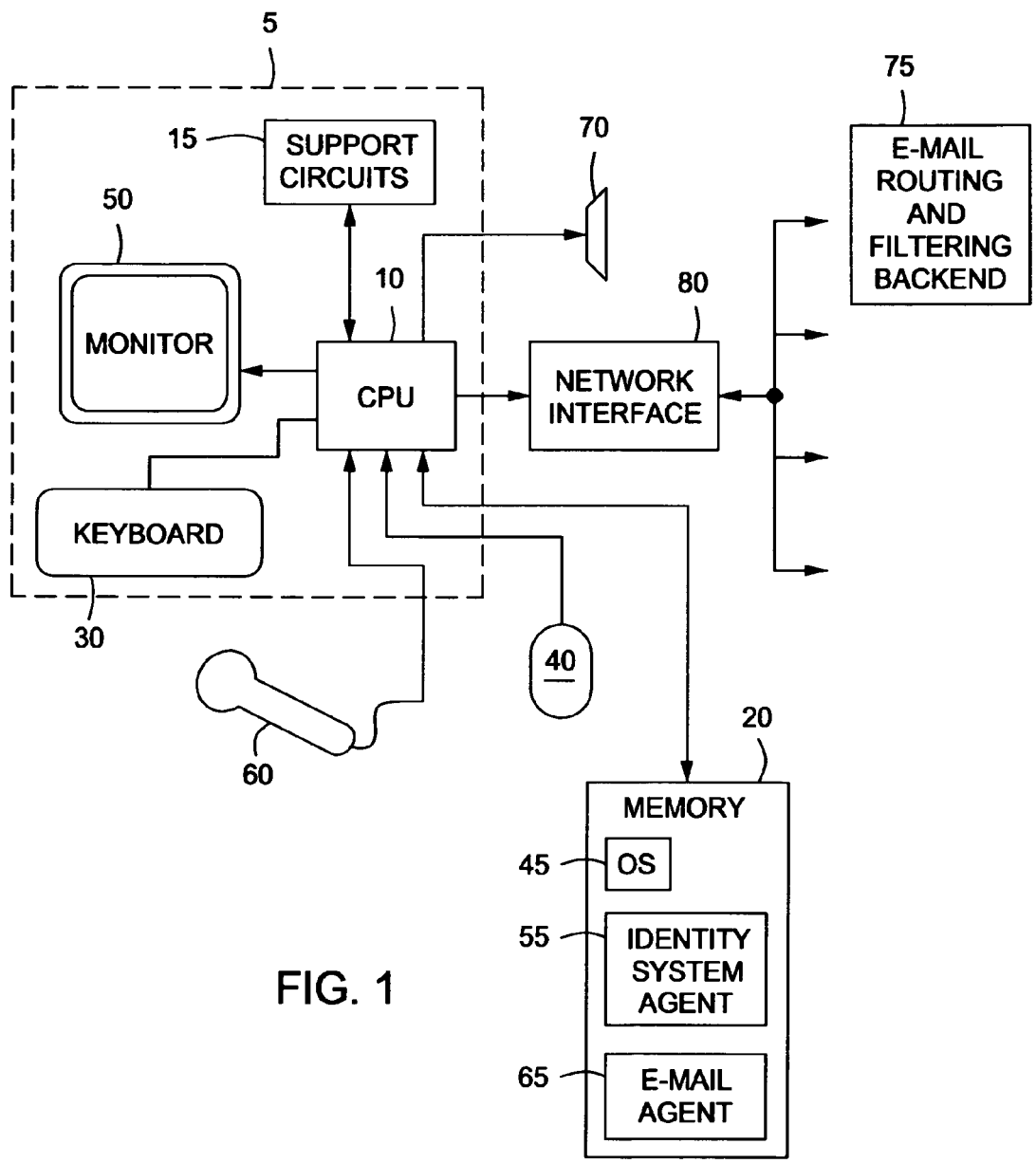
FIG. 1 depicts a representative computer system used to perform at least one embodiment of the invention.

FIG. 1 depicts a representative computer system used to perform at least one embodiment of the invention. Those skilled in the art will understand that there are many computer systems configurations and variations and it should be understood that the computer system 5 presented in FIG. 1 is not meant to limit the configurations within which the many embodiments, as described below, can be employed. The computer 5 comprises at least one central processing unit (CPU) 10, input/output devices 30, 60, 70, support circuits 15, memory 20 and a monitor 50. The input/output devices, for example, comprise one or more of a mouse 40, a microphone 60 and a speaker 70. The mouse 40, the microphone 60 and the speaker 70 can be used for, among other purposes, universal access and voice recognition or commanding. The monitor 50 can be touch-sensitive to operate as an input device as well as a display device. The computer system 5 can interface with external databases, an e-mail routing and filtering backend 75, or the Internet via the network interface 80. It should be understood that the term "network interface" does not indicate a limitation to interfaces that use only Ethernet connections and refers to all possible external interfaces, wired or wireless.

It should be understood that even though the computer system 5 is shown as a platform on which the methods described can be performed, the methods described can be performed on any platform where users can interact with Internet sites or service providers. For example, the many and varied embodiments described herein can be used on any device that has computing capability where users interact with service providers or Internet sites. These devices can include but are not limited to and are presented for illustrative purposes only, distributed computer networks, hand held PCs, laptops, devices sold under the trademark names BLACKBERRY or PALM, cellular phones, hand held music players, or any other device or system upon which a user can interact with service providers or internet sites.

Computer programs are stored in the memory 20 and the CPU 10 operates in concert with at least the memory 20, the support circuits 15, the input/output devices 30, 60, 70 and the monitor 50 to perform tasks for the user. The support circuits 15 comprise well-known circuits and devices that are used to facilitate functionality of the CPU 10. The support circuits comprise, for example, clock circuits, cache, power supplies, and the like. For working with e-mail and other electronic communications, the e-mail routing and filtering backend 75 can send e-mail to and receive e-mail from at least the CPU 10.

In one or more embodiments, the memory 20 includes any number and combination of memory devices, without limitation, as is currently available or can become available in the art. Such memory devices include without limitation, and for illustrative purposes only: hard drives, disk drives, random access memory, read only memory, electronically erasable programmable read only memory, flash memory, thumb drive, and any other memory device. Those skilled in the art are familiar with the many variations that can be employed using memory devices and no limitations should be imposed on the embodiments herein due to memory device configurations and algorithm prosecution techniques. It should be understood that although the e-mail routing and filtering backend 75 is depicted as an external interface to the computer system 5, the e-mail routing and filtering backend 75 can be stored in and operated on from the memory 20.

The memory 20 stores an operating system (OS) 45, identity system agent 55, and an e-mail agent 65. The e-mail agent 65 is also known as a mail user agent (MUA). Examples of MUAs known in the art include the packages distributed under the trademark names ENTOURAGE, OUTLOOK, APPLE MAIL, YAHOO MAIL, and the like. The e-mail agent 65 can be used by a user to download, read, and respond to their e-mail. It should be understood, notwithstanding the depiction of a separate identity system 55 and e-mail agent 65, the two functions can be performed by one or more software packages and the depiction in FIG. 1 is not a limitation to the embodiments herein.

The operating system 45 facilitates control and execution of software using the CPU 10. Any of the available operating systems may be used in this manner including WINDOWS, LINUX, Apple OS, UNIX and the like. In accordance with one embodiment of the invention, the CPU 10 executes the identity system 55 when a user requests, among other requests, a new e-mail address be provisioned. After the new e-mail is provisioned, the identity system 55 notifies the e-mail routing and filtering backend of the new address and associated attributes. For example, associated attributes may include a list of authorized site-specific senders, authorized persona specific senders, or any list of authorized senders.

When the backend 75 receives an e-mail, the e-mail sender identity is compared to the e-mail attributes of the dynamically created e-mail address. If the sender is an authorized sender, as explained below, the backend 75 forwards the e-mail to the user or for further processing or sorting. If the sender is not an authorized sender, the backend 75 can label the e-mail as high confidence spam and route the e-mail according to spam rules set within the backend 75 or within the e-mail agent 65. Details of the process are described below.

It should be understood that an e-mail address or other electronic identity address can be created manually by a user and the user can define attributes, for example, authorized senders and site-specific or persona specific designations for use by the backend 75. Accordingly, the embodiments herein described are in no way limited to use only with identity system 55 generated addresses.

Figure 2:
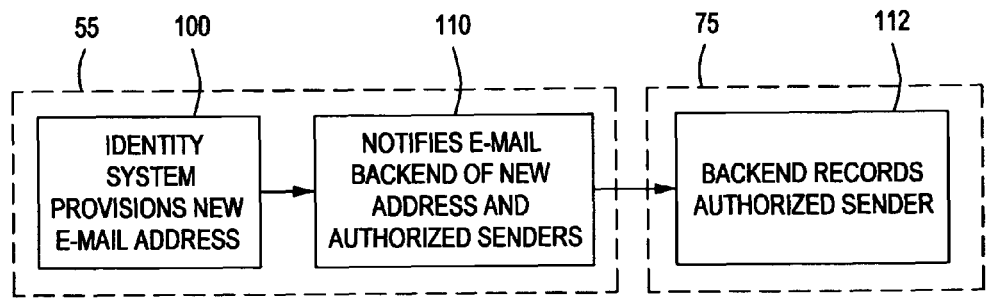
FIG. 2 depicts a flow diagram illustrating an embodiment of a method for enabling routing and filtering of electronic communications based on a dynamic identity.

FIG. 2 depicts a flow diagram illustrating an embodiment of a method for enabling routing and filtering of electronic communications based on a dynamic identity. At step 100, a new electronic address, for example an e-mail address, is generated and that address is associated with attributes from a given site-specific or persona specific identity. For example, the identity system 55 automatically generates a site-specific e-mail address by generating a unique e-mail address name for use only with a particular site. In one embodiment, the e-mail address name is randomly generated from a list of characters and numbers. Alternatively, the e-mail address is generated using variations on a user persona nickname or is generated using an expert system architecture. The e-mail address can be generated by any software program or identity system 55 that can suggest account names to an e-mail account provider and confirm they are valid and available.

Once a new, valid e-mail address is generated, at step 110, the identity system 55 dynamically generates or provisions the account by associating certain user requested attributes with the new, valid account including defining a list of authorized senders or users of that account. For example, a user can choose to associate a particular gambling site with the new, valid e-mail address. That particular gambling site can then be defined as the only allowed sender of e-mail to the new, valid e-mail address. The user can add or subtract authorized senders to the list of authorized senders using a graphical user interface or other interface understood in the art. Authorized senders are persons, sites, or service providers to whom the new, valid e-mail address is provided or to whom the user has defined as authorized senders. Any other senders should not have the new, valid e-mail address and e-mail received from senders not defined as authorized senders is labeled as high confidence spam. It should be understood that word "list", as used in the phrase "list of authorized senders", does not imply a limitation on how the authorized senders information for a particular provisioned e-mail address is stored.

For persona-specific identities, the identity system 55 is set to use a given persona-specific e-mail address with all sites and/or service providers that fit that particular persona. For example, the user sets a preference that instructs the identity system 55 to use their gambling persona e-mail address with all gambling sites and/or service providers. The identity system 55 records every site and/or service provider to which the new, valid e-mail address is provided. All the sites and/or service providers to whom the new, valid e-mail address is supplied are defined as the authorized users of that new, valid e-mail address. Once an e-mail is provisioned with at least a valid address and one authorized sender, the identity system 55 saves the provisioned e-mail for later use.

For the purposes of this disclosure, a provisioned e-mail is also referred to as a dynamic identity. The identity is dynamic because it can change over time. For example, when a persona-specific e-mail address is first provisioned, it may have a few as one authorized sender. Over time, however, as the e-mail is provided to more persona-specific sites and/or service providers, the authorized senders' list may change.

In one or more embodiments, after the identity system 55 provisions a new e-mail address, at step 110, the identity system 55 notifies the e-mail backend 75 of provisioned e-mail address or the new address and authorized senders. At step 112, the backend 75 records the e-mail address and the authorized senders 112. The backend 75 is then enabled to use the e-mail address and authorized senders or dynamic identity information to route and filter e-mails. It should be understood that even though the identity system 55 and the e-mail routing and filtering backend 75 are depicted as separate modules, they may be a single software program, a distributed program, or some other configurations. The depicted embodiment is not intended to limit the embodiments described herein.

Figure 3:
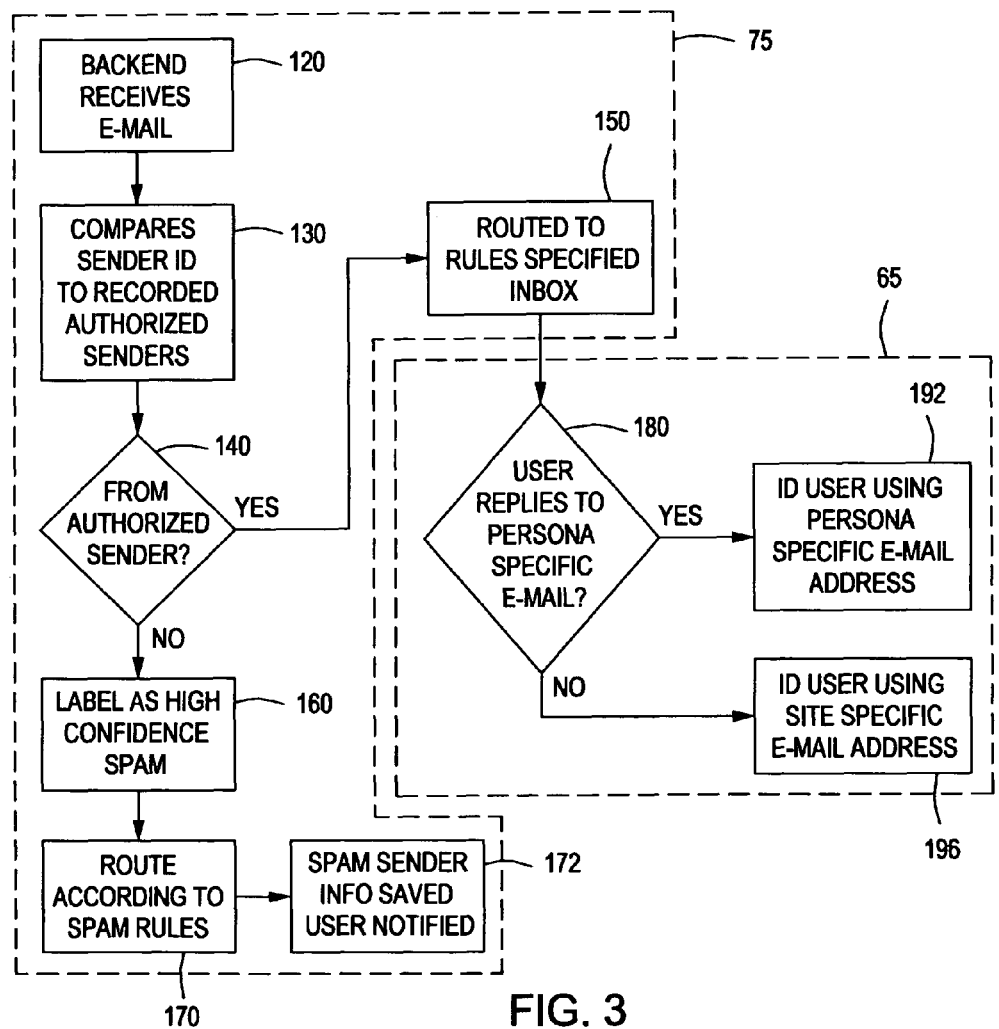
FIG. 3 depicts a flow diagram illustrating an alternative embodiment of a method for routing and filtering e-mail messages based on dynamic identities.

FIG. 3 depicts a flow diagram illustrating an embodiment of a method for routing and filtering e-mail messages based on dynamic identities. The e-mail routing and filtering backend 75 routes e-mail to and from users in accordance with routing constraints defined by the dynamic identities. At step 120, when the backend 75 receives an e-mail addressed to an automatically provisioned, site-specific or persona specific e-mail recipient, at step 130, the backend 75 compares the e-mail sender identity to the recorded authorized senders provided by a given dynamic identity. If, at query step 140, the backend 75 determines the e-mail was sent from an authorized sender, the e-mail is routed, at step 150, to a rule specified inbox. Rule specified inboxes may include one of a number of user owned hierarchical sub-folder inboxes or other user owned inboxes, each inbox being associated with a particular site-specific or persona-specific identity.

If, at step 140, the backend 75 determines the e-mail was sent by a sender who is not an authorized sender, at step 160, the backend 75 labels the e-mail as high confidence spam and, at step 170, routes the e-mail according to spam rules. Spam rules are e-mail routing rules understood in the art and can include, but are not limited to, deleting the e-mail, quarantining the e-mail with other spam, or routing the e-mail to a spam inbox as defined by the user.

In one or more embodiments of the invention, at step 172, the spam sender data set or spam sender information is saved and the user is notified. Spam notices may be sent to the user to inform them of the spam and give the user specific information, a data set, about who sent the spam and/or about which site or service provider is spreading the given user e-mail address to non-authorized senders.

Determining the spam sender data set can be performed by correlating the list of authorized senders with the sites that are sending spam. For example, if there is one authorized sender and spam is addressed to the e-mail address associated with that authorized sender, it is understood that that authorized sender is likely distributing the e-mail address to other senders. The other senders can be identified by their sender identification information found in the received e-mails. In this way, the user can block the other senders using, for example, one or more of several spam filters known in the art.

Also based on the notification provided in step 172, the user can decide what other actions to take to protect their personal information. For example, the user may decide to stop interacting with the site and/or service provider associated with sharing the user e-mail addresses. The user can complain to government authorities, share the information on chat sites or bulletin boards, or can take any action the user feels is appropriate. The saved sender information can also be used, for example, by security services that can develop a reputation database based on how different sites are using personal information. The reputation data can be sold to users to help them avoid loss of personal information.

Using the email agent 65, at step 180, the user can choose to respond to the e-mails sorted into site-specific and/or persona specific inboxes. If a user replies to a rule specified inbox message, for example, a user replies to a site-specific e-mail message, the e-mail agent 65 senses the reply and, at step 196, identifies the user using that particular site-specific e-mail address. On the other hand, if the user replies to a persona-specific e-mail message, at step 192, the e-mail agent 65 identifies the user using that particular persona-specific e-mail address. For example, if the original e-mail message to which the user is responding was sent to overlord@123company.com, but the user is responding to the e-mail from an e-mail agent with an outbox sender address set to tom@abccompany.com, the e-mail agent 65 can default the e-mail sender address for the response to overlord@123company.com. This can help keep the user identity intact with respect to communications between the user and a given site or service provider and help prevent identity correlation.

It should be understood that, although some functions in FIG. 2 and FIG. 3 are depicted as being performed by the backend 75, other functions by the e-mail agent 65, and yet other functions performed by the identity system 55, this depicted arrangement is not intended to be a limitation as to how the functions are performed. In other words, there is no limitation that the functions depicted in FIG. 2 and FIG. 3 be performed by any particular software package. It should also be understood that backend 75, e-mail agent 65, and identity system 55 can be contained within one or more software packages executing on a single computer or distributed over a plurality of computers.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

The invention claimed is:

1. A method performed by a computer system for enabling e-mail routing and filtering based on dynamic identities, the method comprising:
provisioning a new e-mail address associated with a specific identity using the computer system, wherein the specific identity controls routing of e-mail traffic associated with the new e-mail address, and wherein the new e-mail address is one of a plurality of e-mail addresses provisioned for a user having a dynamic identity comprising a respective plurality of specific identities;
notifying an e-mail backend of the new e-mail address, wherein the new e-mail address includes a list of authorized senders;
recording the new e-mail address and the authorized senders;
receiving an e-mail;
comparing an e-mail sender identity of the received e-mail to the authorized senders;
determining the e-mail sender identity is not associated with one of the authorized senders; and
routing incoming e-mail traffic addressed to the new e-mail address using an e-mail client executing on the computer system to a rule specified inbox associated with the specific identity associated with the new e-mail address if an e-mail sender identity of a received e-mail is associated with at least one of the authorized senders, wherein the rule specified inbox is a separate inbox associated with the specific identity, and wherein the incoming e-mail traffic is routed to the rule specified inbox based at least in part on at least one of a specific site and a specific persona associated with the specific identity, the specific persona for use in communications with a plurality of sites.

2. The method of claim 1 wherein the specific identity is at least one of a specific site and a specific persona, the specific persona for use in communications with a plurality of sites.

3. The method of claim 1 further comprising:
sending a reply to a received e-mail; and identifying the reply as being sent from the new e-mail address.

4. The method of claim 3 wherein the new email address is a site-specific e-mail address and the rule specified inbox is a site-specific inbox associated with the site-specific e-mail address.

5. The method of claim 3 wherein the new email address is a persona-specific e-mail address and the rule specified inbox is a persona-specific inbox associated with the persona-specific e-mail address.

6. The method of claim 1 further comprising labeling the e-mail as high confidence spam.

7. The method of claim 1 further comprising:
saving a spam sender data set; and
notifying the user regarding the spam sender data set.

8. The method of claim 1 further comprising:
in response to determining the e-mail sender identity is not associated with one of the authorized senders, determining which site or service provider shared the new e-mail address with a sender associated with the email sender identity; and
notifying the user regarding the site or service provider that shared the new e-mail address.

9. The method of claim 1 wherein the dynamic identities comprise specific identities that are configured to be updated, when the list of authorized senders is updated.

10. A method performed by a computer system for enabling e-mail routing and filtering based on dynamic identities, the method comprising:
provisioning a new e-mail address associated with a specific identity using the computer system, wherein the specific identity controls routing of e-mail traffic associated with the new e-mail address, wherein the new e-mail address is one of a plurality of e-mail addresses provisioned for a user having a dynamic identity comprising a respective plurality of specific identities;
notifying an e-mail backend of the new e-mail address, wherein the new e-mail address includes a list of authorized senders;
recording the new e-mail address and the authorized senders;
receiving an e-mail addressed to the new e-mail address;
comparing an e-mail sender identity of the received e-mail to the authorized senders;
determining the e-mail sender identity is associated with one of the authorized senders or an unauthorized sender; and
routing the received e-mail addressed to the new e-mail address to a rule specified inbox depending upon whether the email sender identity is associated with one of the authorized senders or an unauthorized sender, wherein the rule specified inbox is a particular inbox associated with the specific identity associated with the new e-mail address if the e-mail sender identity is associated with at least one of the authorized senders, and wherein the received e-mail is routed to the rule specified inbox based at least in part on at least one of a specific site and a specific persona associated with the specific identity, the specific persona for use in communications with a plurality of sites.

11. The method of claim 10 wherein the rule specified inbox is at least one of a spam inbox for unauthorized sender email and a particular inbox for authorized e-mail, and wherein the particular inbox depends upon an identification of an authorized sender.

12. The apparatus of claim 10 wherein the dynamic identities comprise specific identities that are configured to be updated, when the list of authorized senders is updated.

13. An apparatus for enabling e-mail routing and filtering based on dynamic identities, the apparatus comprising:
   means for provisioning a new e-mail address associated with a specific identity using the computer system, wherein the specific identity controls routing of e-mail traffic associated with the new e-mail address, and wherein the new e-mail address is one of a plurality of e-mail addresses provisioned for a user having a dynamic identity comprising a respective plurality of specific identities;
   means for notifying an e-mail backend of the new e-mail address, wherein the new e-mail address includes a list of authorized senders;
   means for recording an authorized sender;
   means for receiving an e-mail;
   means for comparing an e-mail sender identity of the received e-mail to the authorized sender;
   means for determining the e-mail sender identity is not associated with the authorized sender; and
   means for routing incoming e-mail traffic addressed to the new e-mail address to a rule specified inbox associated with the specific identity associated with the new e-mail address if an e-mail sender identity of a received e-mail is associated with at least one of the authorized senders, wherein the rule specified inbox is a separate inbox associated with the specific identity, and wherein the incoming e-mail traffic is routed to the rule specified inbox based at least in part on at least one of a specific site and a specific persona associated with the specific identity, the specific persona for use with a plurality of sites.

14. The apparatus of claim 13 further comprising:
   means for sending a reply to a received e-mail; and
   means for identifying the reply as being sent from the new e-mail address.

15. The apparatus of claim 13 further comprising:
   means for saving a spam sender data set; and
   means for notifying the user regarding the spam sender data set.

16. The apparatus of claim 13 further comprising:
   means for in response to determining the e-mail sender identity is not associated with one of the authorized senders, determining which site or service provider shared the new e-mail address with a sender associated with the email sender identity; and
   means for notifying the user regarding the site or service provider that shared the new e-mail address.

* * * * *